(12) United States Patent
Chang

(10) Patent No.: US 7,857,320 B1
(45) Date of Patent: Dec. 28, 2010

(54) BEARING ISOLATOR SEAL WITH FLOATING RING

(76) Inventor: Ming S. Chang, 520 W. 60th Pl., Burr Ridge, IL (US) 60527

( * ) Notice: Subject to any disclaimer, the term of this patent is extended or adjusted under 35 U.S.C. 154(b) by 98 days.

(21) Appl. No.: 12/455,542

(22) Filed: Jun. 3, 2009

(51) Int. Cl.
*F16J 15/36* (2006.01)
(52) U.S. Cl. .................. 277/389; 277/391; 277/422
(58) Field of Classification Search .................. 277/389, 277/391, 386, 422
See application file for complete search history.

(56) References Cited

U.S. PATENT DOCUMENTS

| | | | | |
|---|---|---|---|---|
| 2,394,012 A | * | 2/1946 | Rayburn | 277/379 |
| 2,522,231 A | * | 9/1950 | Loftis | 277/391 |
| 2,586,739 A | | 2/1952 | Summers | |
| 3,137,237 A | * | 6/1964 | Zagar et al. | 417/423.11 |
| 3,895,813 A | * | 7/1975 | Davies et al. | 277/389 |
| 3,947,045 A | * | 3/1976 | Schmidt | 277/379 |
| 3,953,038 A | * | 4/1976 | Ludwig | 277/384 |
| 3,975,028 A | * | 8/1976 | Satsumabayashi et al. | 305/103 |
| 4,323,255 A | | 4/1982 | Wiese | |
| 4,348,031 A | * | 9/1982 | Johnston | 277/363 |
| 4,462,600 A | * | 7/1984 | Johnston | 277/363 |
| 4,482,194 A | * | 11/1984 | Chambers, Sr. | 384/480 |
| 4,522,410 A | * | 6/1985 | Holzer | 277/368 |
| 4,706,968 A | * | 11/1987 | Orlowski | 277/347 |
| 4,795,168 A | | 1/1989 | Adams et al. | |
| 4,836,560 A | * | 6/1989 | Haberberger | 277/385 |
| 4,889,350 A | * | 12/1989 | Tranter | 277/388 |
| 4,890,941 A | * | 1/1990 | Calafell et al. | 277/347 |
| 4,989,883 A | * | 2/1991 | Orlowski | 277/303 |
| 5,009,570 A | * | 4/1991 | Richardson | 415/174.2 |
| 5,161,804 A | | 11/1992 | Orlowski et al. | |
| 5,480,161 A | | 1/1996 | Borowski | |
| 5,498,006 A | * | 3/1996 | Orlowski | 277/419 |
| 6,244,599 B1 | | 6/2001 | Braun et al. | |
| 6,311,984 B1 | * | 11/2001 | Orlowski | 277/418 |
| 6,390,477 B1 | | 5/2002 | Drago et al. | |
| 6,485,022 B1 | * | 11/2002 | Fedorovich | 277/303 |
| 6,866,271 B2 | * | 3/2005 | MacDonald | 277/634 |
| 7,090,220 B2 | * | 8/2006 | Hoeting et al. | 277/347 |
| 7,461,846 B2 | * | 12/2008 | Chitren | 277/347 |
| 7,604,239 B2 | * | 10/2009 | Chitren et al. | 277/301 |

* cited by examiner

*Primary Examiner*—Alison K Pickard
(74) *Attorney, Agent, or Firm*—Philip H. Kier

(57) ABSTRACT

A bearing isolator seal is used to seal the space between the housing and the rotating shaft to prevent contaminants such as abrasive particles, moisture, and corrosive media from entering the bearing. The preferred embodiment consists of a stationary retainer ring with a groove for an O-ring adjacent to a bearing housing, a rotating mating ring with a groove for a second O-ring adjacent to a rotating shaft, and a floating ring made of a material with a low coefficient of friction and a low elastic modulus. The cross-section of the floating ring can be Z-shaped, U-shaped, or V-shaped. A C-shaped locking ring is used as an aid to assemble the aforementioned seal components into a module and is subsequently removed after the seal is installed. Contaminants are stopped at both ends of the floating ring as well as at the O-rings by their spring action. The seal is also designed to release pressure built up in the bearing lubricating system.

6 Claims, 4 Drawing Sheets

BEARING ISOLATOR SEAL WITH FLOATING RING

BACKGROUND OF THE INVENTION

The present invention relates to a seal for a rotating shaft and its housing. More particularly, it relates to the bearing isolator seal that uses a floating ring to seal stationary and rotating components.

Pumps, turbines, and electric motors contain shafts that rotate at a relatively high speed. The shafts are supported by at least one bearing to reduce friction. In these machines it is necessary to seal the space between the housing and the rotating shaft to prevent contaminants such as abrasive particles, moisture, or corrosive media from entering the bearing. A seal that performs such a task is traditionally referred to as a bearing isolator seal. Over the years, various types of seals have been developed to protect bearings. These include lip seals, labyrinth seals, magnetic seals, and brush seals.

The most commonly used and least expensive bearing isolator seal is the lip seal. A lip seal has a flexible leg pressed against the surface of the rotating shaft. Labyrinth seals have grooves in seal rings that impose a tortuous path that inhibits entry of contaminants into the bearing. An improved labyrinth seal that contains porous elements in the pathway to prevent the ingress of contaminated material is taught by Borowski in U.S. Pat. No. 5,480,161. Magnetic sealing systems rely on magnetic forces to maintain seal closure. Closure integrity can be maintained by magnetic attraction as in U.S. Pat. No. 4,795,168 or by magnetic repulsion as taught by Orlowski and Bloch in U.S. Pat. No. 5,161,804. Another type of seal is the brush seal, which is well suited for use with shafts that rotate at relatively high speed. Brush seals may have a variety of configurations. In a conventional configuration, bristles contact the rotating shaft and are flexible enough to allow the shaft to rotate but still maintain a seal while their holder is fixed to a stationary support holder. There are brush seal designs in which the brush or brushes are allowed to float as taught by Braun and Chey in U.S. Pat. No. 6,244,599.

Bearing life is shortened by bearing corrosion, which is caused by moisture and/or corrosive media. The prior art of bearing isolator seals is somewhat flawed because of potential problems with either sealing out moisture or corrosive media (identified with labyrinth or brush types) or with running dry or under too little lubrication (identified with lip or magnetic types). Lip type and magnetic type seals are contact seals that exclude contaminants well but require lubrication at seal contacting faces. A standard bearing lubrication system is not designed to provide lubrication for the bearing isolator seal.

The present invention is a contact type bearing isolator seal. Its novel features include a floating ring between a stationary retainer ring and a mating ring that rotates with a shaft. The floating ring is made of a material with a low coefficient of friction and a low elastic modulus such as polytetrafluoroethylene (PTFE) or graphite/PTFE composite. The floating ring can have several cross-sectional shapes, e.g. Z-shaped, U-shaped, and V-shaped.

SUMMARY OF THE INVENTION

The present invention is a bearing isolator seal that is basically a mechanical seal. The seal is composed of stationary components, rotating components, and a floating ring. The stationary components include a retainer ring with an O-ring in its outer diameter groove. The rotating components include a mating ring with an O-ring in an inner diameter groove. A floating ring is placed between the retainer ring and the mating ring. The floating ring can have several cross sectional shapes, e.g., Z-shaped, U-shaped, and V-shaped. The floating ring is in a compressed state when the bearing isolator seal is assembled and installed. The floating ring has a short axial length and is made of a material with a low coefficient of friction and a low elastic modulus, such as PTFE or a graphite/PTFE composite.

The bearing isolator is assembled as follows: 1) the floating ring is placed into the retainer ring; 2) the mating ring is placed next to the floating ring; 3) a C-shaped locking ring is placed into an inner diameter of the retainer ring to lock the floating ring and the mating ring inside; 4) an O-ring is placed in the outer diameter groove of the retainer ring and 5) a second O-ring is placed in an inner diameter groove in the mating ring.

The C-shaped locking ring is removed after the bearing isolator seal is properly installed next to the bearing it intends to protect. The O-ring in the outer diameter groove of the retainer ring and the O-ring in the inner diameter ring of the mating ring are compressed to provide sealing action and to hold the retainer ring and the mating ring in position on the housing and the shaft respectively. The floating ring is still compressed between the retainer ring and the mating ring to provide sealing action on both ends of the floating ring. When pressure builds up in the bearing system, the floating ring will further deform to allow gas to escape.

This invention has the following objectives: 1) to provide a bearing isolator seal that not only excludes abrasive particles, but also seals off moisture and corrosive media; 2) to shorten the axial length of the bearing isolator seal; 3) to automatically release pressure built up in the bearing lubricating system; and 4) to simplify assembly and installation.

BRIEF DESCRIPTION OF THE SEVERAL VIEWS

DETAILED DESCRIPTION OF THE INVENTION

Figure 1:
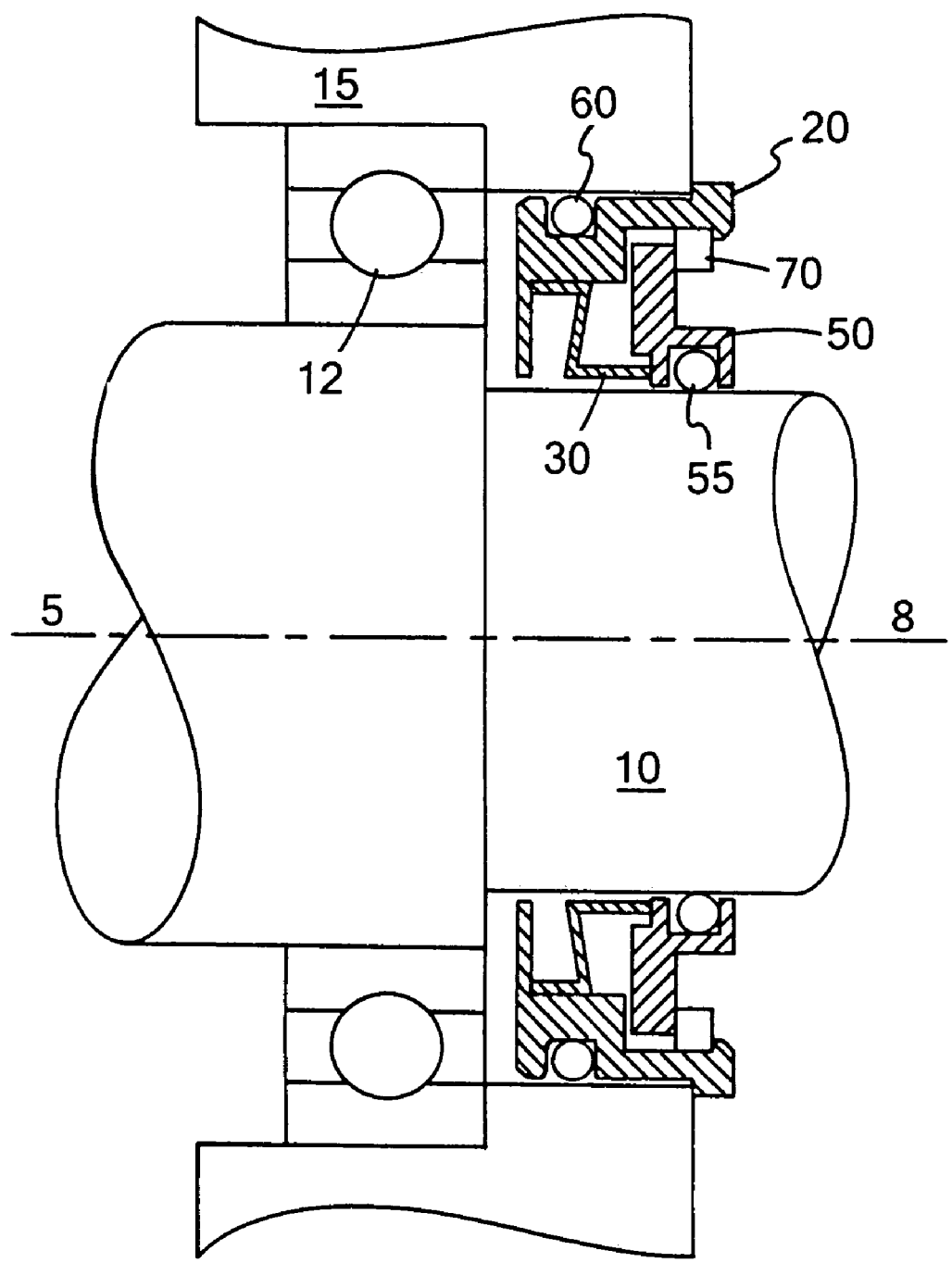
FIG. 1 is a vertical cross-sectional view of an installed bearing isolator seal with a Z-shaped floating ring under compression.
Figure 2:
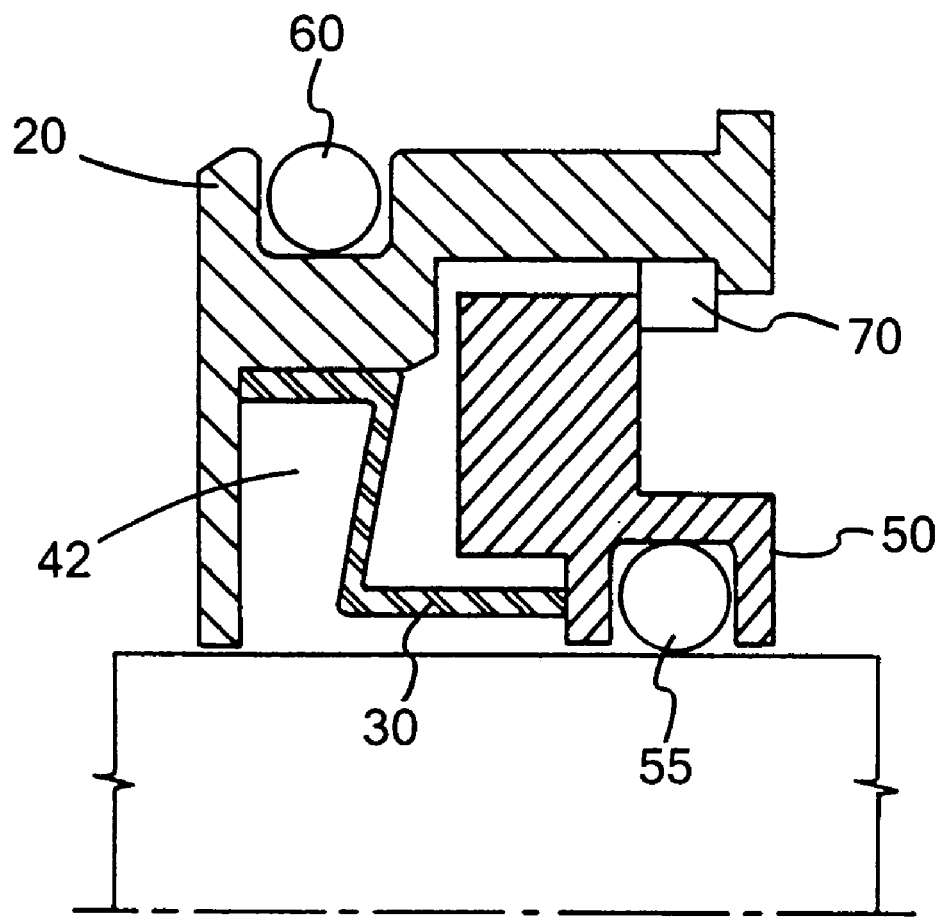
FIG. 2 is a vertical cross-sectional view of a bearing isolator seal with a Z-shaped floating ring under compression.

A preferred embodiment of a floating ring bearing isolator seal in accordance with the present invention is shown mounted on a rotary shaft 10, adjacent to bearing 12, and contained within housing 15 in FIG. 1. The seal has a retainer ring 20 that encompasses other components of the seal except for an O-ring 60 that fits in a groove in the outer surface of the retainer ring adjacent to the housing. The retainer ring has a Γ-shaped cross-section but with its horizontal section displaced in part to accommodate the groove for O-ring 60. Embedded in a cavity in the inner surface of the retainer ring are several components. There is a floating ring 30 with a Z-shaped cross section that is made of a material with a low coefficient of friction and a low elastic modulus such as PTFE or PTFE/graphite composite. Also enclosed within the retainer ring 20 is a mating ring 50 with a second O-ring 55 in an inner diameter groove adjacent to shaft 10. The mating ring's cross section is h-shaped. The three main rings—the retainer ring with an outer O-ring, floating ring, and mating ring with an inner O-ring—are assembled as a module by using a C-shaped locking ring 70 as shown in FIG. 1 and FIG. 2. The floating ring 30 is under axial compression when the bearing isolator seal is assembled. Spring force from compressed floating ring 30 keeps the floating ring in tight contact with the retainer ring 20 and with the mating ring 50.

The locking ring 70 is removed after the bearing isolator seal is installed next to the bearing 12 it intends to protect. After the locking ring is removed, the compressed floating ring 30 tends to spring back to its free state. However, O-ring 60 and O-ring 55 will hold retainer ring 20 and mating ring 50 on housing 15 and rotary shaft 10 in axial position, respectively. The O-rings are made of an elastomer, which has a high coefficient of friction. O-ring 55 on the inner diameter of mating ring 50 is compressed to rotate with the rotary shaft 10 and the O-ring 60 in the outer diameter groove of retainer ring 20 is also compressed to stay stationary with housing 15. O-ring 60 and O-ring 55 are also used to hold retainer ring 20 and mating ring 50 in axial position on housing 15 and rotating shaft 10 respectively.

Floating ring 30 has a Z-shaped cross section to create a channel 42 between it and retainer ring 20. When pressure builds up on the bearing side, floating ring 30 is deformed further and pushed away from retainer ring 20 to release this pressure. When the pressure in channel 42 is released, the seal contact between the retainer ring and the floating ring is restored.

The main objective of a bearing isolator seal is to exclude contaminants, such as abrasive particles, moisture and corrosive media from entering the bearing. In this invention, contaminants are stopped by O-rings 55 and 60 as well as by closed seal faces between stationary retainer ring 20 and the floating ring 30, and between rotating mating ring 50 and the floating ring 30.

Figure 3:
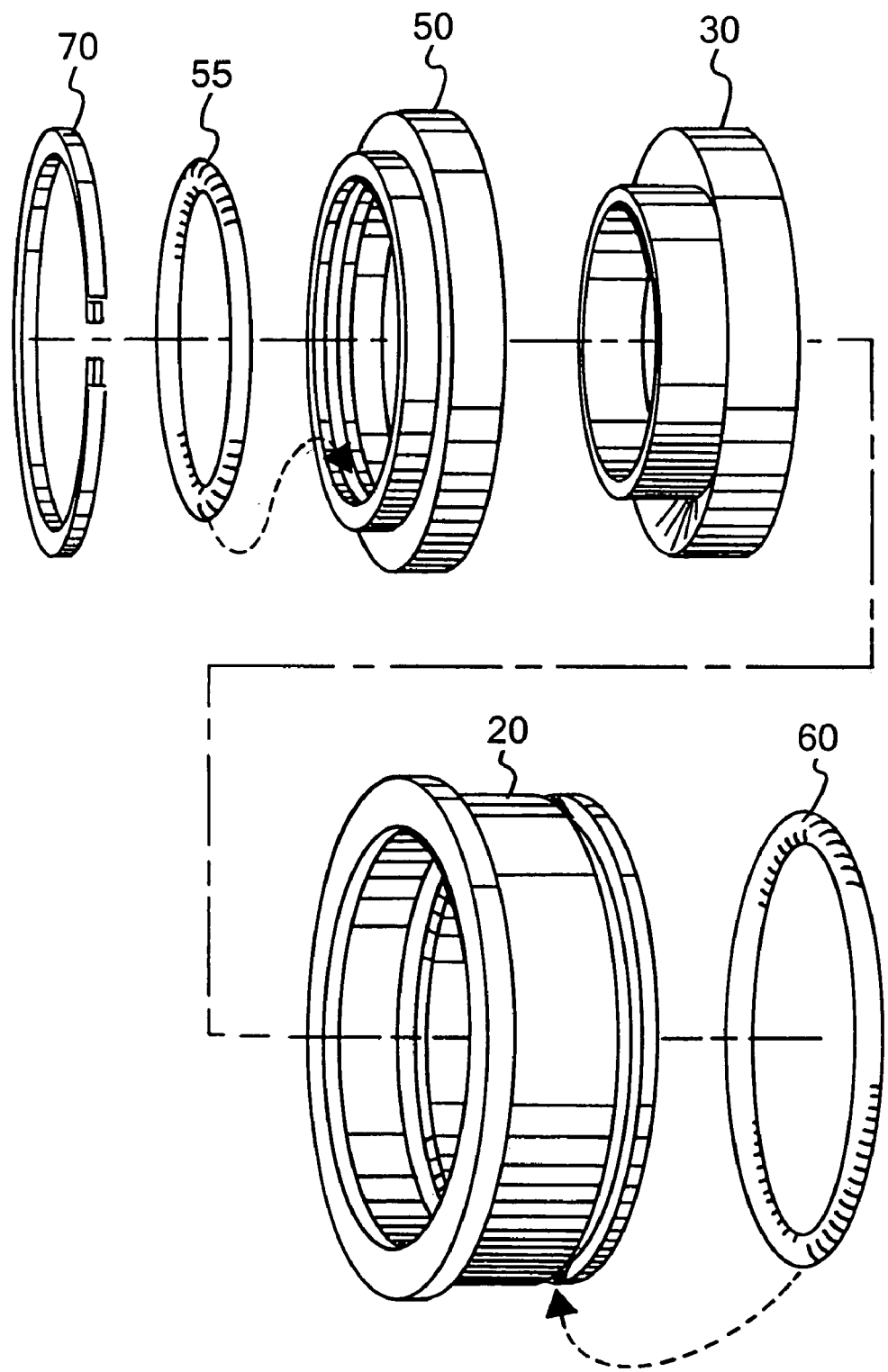
FIG. 3 is an exploded perspective view of the bearing isolator seal with a Z-shaped floating ring in a free state.

FIG. 3 shows how the bearing isolator seal is assembled as a cartridge or a module. Floating ring 30 is placed within retainer ring 20. Then a unit consisting of mating ring 50 and inner O-ring 55 is placed within retainer ring 20. Finally, C-shaped locking ring 70 is placed within a groove in the inner diameter of retainer ring 20 to hold all components of the bearing isolator seal together.

Figure 4:
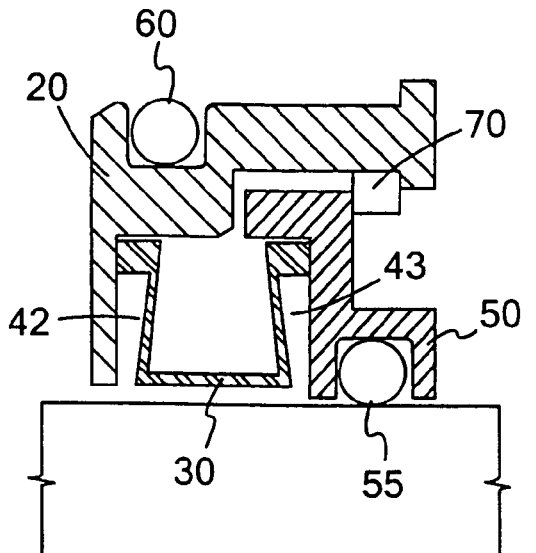
FIG. 4 is a vertical cross-sectional view of a bearing isolator seal with a U-shaped floating ring under compression.
Figure 5:
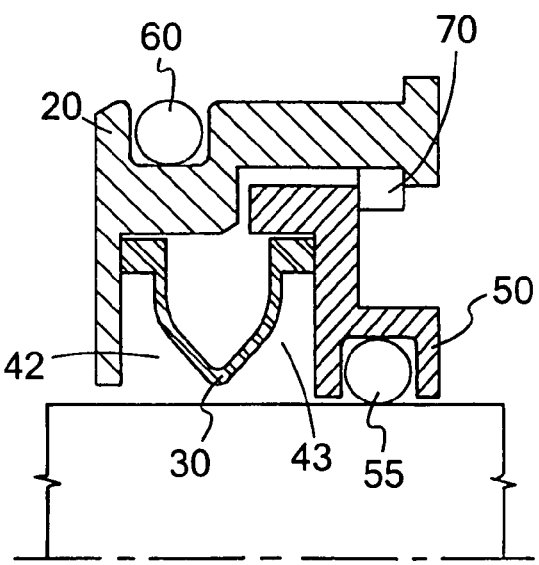
FIG. 5 is a vertical cross-sectional view of a bearing isolator seal with a V-shaped floating ring under compression.

In the embodiment shown in FIG. 4, the floating ring now has a U-shaped cross section and in the embodiment shown in FIG. 5, the floating ring has a V-shaped cross section. The floating ring 30 for both embodiments is still made of a material with a low coefficient of friction and a low elastic modulus. The spring action of the compressed floating ring still provides the forces for the contact between itself and retainer ring 20 and for contact between itself and mating ring 50. Channels 42 and 43 between the floating ring and the retainer ring, and between the floating ring and the mating ring, respectively, still provide pressure relief when the pressure surges on the bearing side.

Figure 6:
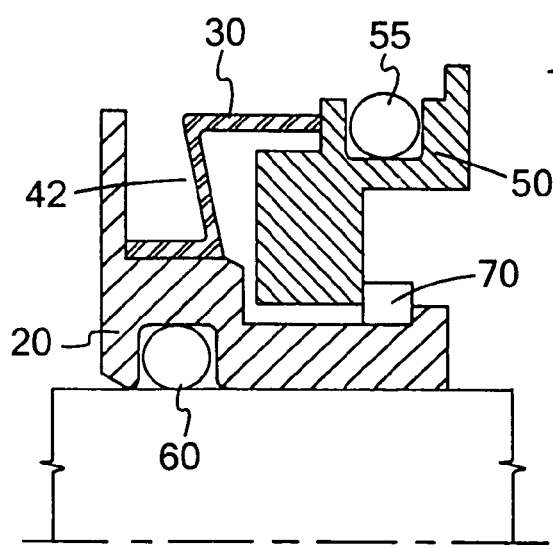
FIG. 6 is a vertical cross-sectional view of a bearing isolator seal with an inverted Z-shaped floating ring under compression, but with the positions of the rotating ring and the stationary ring reversed from those shown in FIG. 2.

FIG. 6 shows an alternative embodiment of a bearing isolator seal with the stationary and rotating components reversed from the embodiment shown in FIG. 2. The inverted Γ-shaped cross-section retainer ring 20 and its O-ring 60 become the rotating components while the mating ring 50 and its O-ring 55 become the stationary components. This embodiment has the same operating characteristics as the embodiment shown in FIG. 2 has. Although FIG. 6 shows a floating ring with an inverted Z-shaped cross-section, the cross-section of the floating ring in an embodiment with reversed rotating and stationary components could just as well have an inverted U-shaped or an inverted V-shaped cross-section.

I claim:

1. A bearing isolator seal situated between a bearing housing and a rotating shaft, the bearing isolator seal comprised of the following arrangement:

a stationary retainer with an O-ring in a groove in its outer diameter facing the bear housing, the retainer ring having a generally Γ-shaped cross section but with its horizontal member displaced in part to accommodate the groove containing the O-ring;

a rotating mating ring with an O-ring in its inner diameter facing the rotating shaft, the mating ring having an h-shaped cross section;

a floating ring under axial compression in tight contact with the retainer ring and with the mating ring forming a pressure releasing channel between the floating ring and the retainer ring, the floating ring having a cross-section selected from the group comprising a Z-shape, V-shape, and U-shape and being made of a material having a low coefficient of friction and a low elastic modulus; and a removable C-shaped locking ring placed in the retainer ring's inner diameter and holding the retainer ring, mating ring, and floating ring in place during installation.

2. A bearing isolator seal as set forth in claim 1 wherein the floating ring has a V-shaped cross-section that forms a first channel between the floating ring and the retainer ring, and a second channel between the floating ring and the mating ring.

3. A bearing isolator seal as set forth in claim 1 wherein the floating ring has a U-shaped cross-section that forms a channel between the floating ring and the retainer ring, and a second channel between the floating ring and the mating ring.

4. A bearing isolator seal situated between a bearing housing and a rotating shaft, the bearing isolator seal comprised of the following reversed arrangement:

a rotating retainer ring that has an inverted Γ-shaped cross-section but with its horizontal section displaced in part to accommodate a groove in its inner diameter for an O-ring facing the rotating shaft;

a stationary mating ring that has an inverted h-shaped cross-section with an O-ring in a groove in its outer diameter facing the housing;

a floating ring that has cross-section selected from the group comprising an inverted Z-shape, an inverted V-shape, and an inverted U-shape and is made of a material with a low coefficient of friction and a low elastic modulus under axial compression in tight contact with the retainer ring and the mating ring, forming a pressure-releasing channel between the floating ring and the retainer ring; and a removable C-shaped locking ring placed in the outer diameter of the retainer ring and holding the retainer ring, mating ring, and floating ring in place.

5. A bearing isolator seal as set forth in claim 4 wherein the floating ring has an inverted V-shaped cross-section that forms a channel between the floating ring and the retainer ring, and a second channel between the floating ring and the mating ring.

6. A bearing isolator seal as set forth in claim 4 wherein the floating ring has an inverted U-shaped cross-section that forms a channel between the floating ring and the retainer ring, and a second channel between the floating ring and the mating ring.

* * * * *